(12) United States Patent
Paquis

(10) Patent No.: US 7,322,617 B2
(45) Date of Patent: Jan. 29, 2008

(54) COUPLING ENDPIECE FOR A CORRUGATED TUBE, AND A TUBE FITTED WITH SUCH AN ENDPIECE

(75) Inventor: Yvon Paquis, Vitry le François (FR)

(73) Assignee: Nobel Plastiques, S.A. (FR)

( * ) Notice: Subject to any disclaimer, the term of this patent is extended or adjusted under 35 U.S.C. 154(b) by 1 day.

(21) Appl. No.: 11/319,663

(22) Filed: Dec. 28, 2005

(65) Prior Publication Data

US 2006/0152006 A1 Jul. 13, 2006

(30) Foreign Application Priority Data

Jan. 12, 2005 (FR) .................................. 05 00285

(51) Int. Cl.
*F16L 33/00* (2006.01)
(52) U.S. Cl. ........................ 285/239; 285/903; 285/259
(58) Field of Classification Search ................ 285/256, 285/903, 239, 242, 241, 240, 259
See application file for complete search history.

(56) References Cited

U.S. PATENT DOCUMENTS

| | | | | |
|---|---|---|---|---|
| 4,247,136 | A | * | 1/1981 | Fouss et al. ................. 285/319 |
| 4,286,808 | A | * | 9/1981 | Fouss et al. .............. 285/140.1 |
| 4,865,362 | A | * | 9/1989 | Holden ........................ 285/260 |
| 5,346,264 | A | * | 9/1994 | Law et al. ................. 285/136.1 |
| 5,575,509 | A | | 11/1996 | Wood et al. |
| 6,007,110 | A | | 12/1999 | Amatsutsu |
| 6,561,550 | B1 | | 5/2003 | Kiraz |
| 6,685,233 | B2 | * | 2/2004 | Park et al. ................... 285/272 |

FOREIGN PATENT DOCUMENTS

| | | |
|---|---|---|
| DE | 100 51 272 A1 | 5/2001 |
| DE | 201 13 500 U1 | 10/2001 |
| FR | 2 817 607 A1 | 6/2002 |
| WO | WO 03/071180 A1 | 8/2003 |

* cited by examiner

*Primary Examiner*—David Bochna
(74) *Attorney, Agent, or Firm*—Dykema Gossett PLLC

(57) ABSTRACT

The invention provides a coupling endpiece engageable by force in a corrugated end of a corrugated tube having corrugations following one another at a predetermined pitch and possessing a minimum inside diameter and a maximum inside diameter. The endpiece is constituted by a tubular body possessing a first zone provided on the outside with at least two annular barbs of the Christmas-tree type that are spaced apart by a distance corresponding to the pitch of the corrugations of the tube and having a maximum diameter greater than the maximum inside diameter of the tube, the first zone presenting between the barbs a minimum diameter greater than the minimum inside diameter of the tube, and the body has a second zone extending immediately behind the barbs to receive at least one end corrugation of the tube and having an outside diameter less than a diameter of a junction zone between two annular barbs. The invention also provides a corrugated tube fitted with such an endpiece.

5 Claims, 1 Drawing Sheet

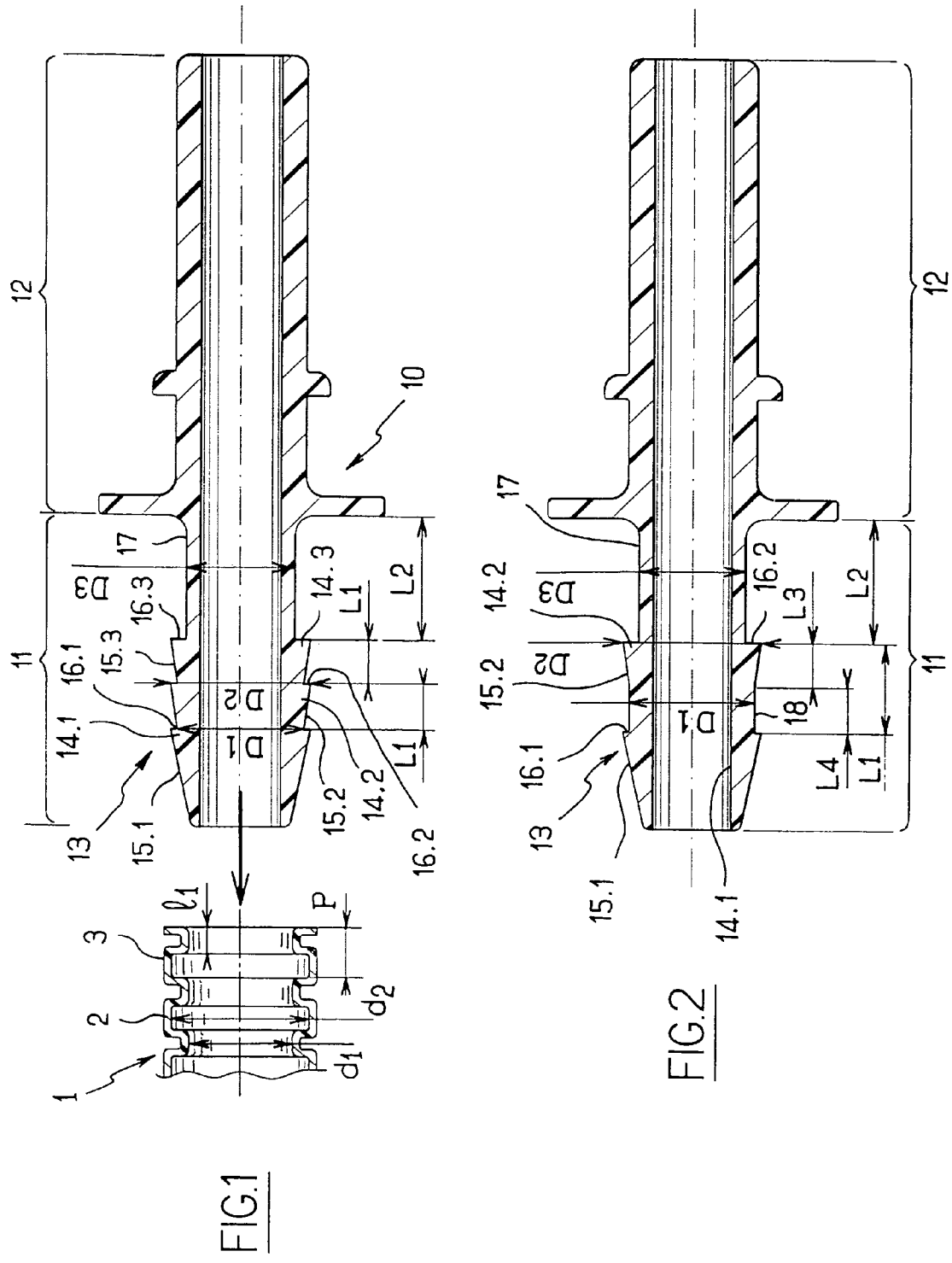

COUPLING ENDPIECE FOR A CORRUGATED TUBE, AND A TUBE FITTED WITH SUCH AN ENDPIECE

The present invention relates to a coupling endpiece engageable by force in a corrugated end of a corrugated tube. The invention also provides a corrugated tube fitted with such an endpiece.

BACKGROUND OF THE INVENTION

Such corrugated tubes are generally fabricated continuously by extrusion (or by co-extrusion for multilayer tubes).

In order to couple a corrugated tube to a coupling, it is known, during extrusion, to provide a smooth zone at the end of the corrugated tube for receiving a coupling that is provided on the outside with annular barbs in a Christmas-tree configuration. Making such a smooth portion on the tube requires special tooling and leads to a reduction in the speed of extrusion, thereby increasing the cost of manufacturing the tube.

It is also known to make a smooth portion at the end of the tube by overmolding a lining of plastics material. That likewise increases the time needed for manufacturing the tube and the cost thereof.

It might be thought that a coupling endpiece having conventional Christmas-tree-shaped barbs could be used with a tube having corrugated ends merely by forcing the endpiece directly into one of the corrugated ends of the tube. However the reliability of such a coupling would be uncertain because of the tendency of the tube to inflate under pressure, which would run the risk of the tube separating from the endpiece.

One way of remedying that drawback would be to reinforce the end of the corrugated tube on the outside in order to restrict deformation thereof. Such reinforcement could be achieved while making the corrugated tube (e.g. by overmolding a rigid ring), but that would return to the above-mentioned drawback concerning lengthening the time needed to manufacture the tube and increasing its cost, or the time needed during assembly (e.g. by putting a clamping collar or the like into place), but then that would increase assembly costs.

OBJECT OF THE INVENTION

An object of the invention is to provide a coupling endpiece engageable by force in a corrugated end of a corrugated tube—i.e. a tube having corrugations following one another at a predetermined pitch and presenting a minimum inside diameter and a maximum outside diameter—in such a manner as to ensure effective coupling between the endpiece and the tube.

BRIEF SUMMARY OF THE INVENTION

To this end, the invention provides a coupling endpiece constituted by a tubular body possessing a first zone provided on the outside with at least two annular barbs of the Christmas-tree type that are spaced apart by a distance corresponding to the pitch of the corrugations of the tube and having a maximum diameter greater than the maximum inside diameter of the tube, the first zone presenting between the barbs a minimum diameter greater than the minimum inside diameter of the tube, and the body having a second zone extending immediately behind the barbs to receive at least one end corrugation of the tube and having an outside diameter less than a diameter of a junction zone between two annular barbs.

Thus, the corrugated tube is firmly clamped on the coupling endpiece and the end corrugation also becomes hooked behind the rear annular barb. The coupling then presents relatively high resistance to being torn out from the tube.

The invention also provides a corrugated tube having an end provided with a coupling device, the coupling device being constituted by an endpiece of the above-specified type.

Other characteristics and advantages of the invention appear on reading the following description of particular and non-limiting embodiments of the invention.

BRIEF DESCRIPTION OF THE DRAWING

Reference is made to the accompanying drawing, in which:

FIG. 1 is a longitudinal section view of a coupling endpiece in accordance with the invention; and FIG. 2 is a view analogous to FIG. 1 showing a variant embodiment.

DETAILED DESCRIPTION OF EMBODIMENTS OF THE INVENTION

With reference to FIG. 1, the coupling endpiece in accordance with the invention is for inserting into a corrugated end of a corrugated tube given overall reference 1, having corrugations 2 that follow one another at a pitch p and that possess a minimum inside diameter d1 and a maximum outside diameter d2.

The coupling endpiece is constituted by a body given overall reference 10, of tubular shape of section given overall reference 11 that is designed to be engaged by force in the end of the corrugated tube 1, and a section given overall reference 12 that is for connecting the endpiece to a circuit element that delivers or receives fluid, such as another tube, a manifold, an actuator, a pump, a tank, . . . . In this example the section 12 is designed to be snap-fastened in said element, and since that is known in itself, it is not described in greater detail. The section 12 could also be made integrally with the circuit element in question.

In the vicinity of its free end, the section 11 has a zone given overall reference 13 that is provided on its outside with annular barbs 14 of the Christmas-tree type. In this example there are three annular barbs referenced 14.1, 14.2, and 14.3 going from the free end of the section 11 towards the section 12.

In this example each annular barb 14 has a front annular face 15 of tapering shape and a rear face 16 that extends radially.

The barbs 14 are spaced apart by a distance L1 corresponding to the pitch p of the corrugations 2. In this example the distance L1 is equal to the pitch p of the corrugations 2.

The barbs 14 present an outside diameter or maximum diameter D2 that is greater than the maximum diameter d2 of the tube 1. In this example, the diameter D2 is determined so as to cause the tube 1 to expand by 30% to 40% in order to obtain relatively great resistance against being torn out. Between successive pairs of barbs 14.1 & 14.2 and 14.2 & 14.3, the zone 13 includes respective adjacent barb junction zones presenting a minimum diameter D1 greater than the minimum inside diameter d1 of the tube 1.

The section 11 of the body 10 comprises behind the barbs 14, i.e. immediately behind the rear face 16.3 of the barb 14.3, a zone 17 for receiving the end corrugation 3 of the tube 1. In this example the zone 17 has a length L2 that is not less than the width ℓof the end corrugation 3, and an outside diameter D3 less than the diameter D1, and in this example close to the minimum inside diameter d1 of the tube 1.

It can thus be seen that the rear face 16.3 forms a step of height greater than the heights of the steps formed by the rear faces 16.1 and 16.2.

By way of example, the dimensions of the section 11 are given for a tube 1 having a pitch of 2.8 millimeters (mm), a minimum inside diameter d1 of 6.2 mm and a maximum inside diameter d2 of 8 mm. For such a tube, the distance L1 at which the barbs 14 are spaced is 2.8 mm, the maximum diameter D2 of the barbs 14 is 8.6 mm, and the minimum diameter D1 of the zone 13 is 7.8 mm, and the diameter D3 of the zone 17 is 6.6 mm.

The endpiece is put into place in the corrugated end of the tube 1 as a force-fit. After being put into place, the endpiece is held in the tube by the clamping force exerted by the tube on the endpiece via the radial faces 16 of the barbs 14 against which the corrugations 2 come into abutment, such that the barbs oppose removal of the tube, and more particularly by the surface 16.3 of the rear barb 14.3 coming into abutment against the end corrugation 3 (the diameter D3 of the zone 17 enabling the end corrugation 3 to hook more securely behind the rear barb 14.3). Since the diameter D3 is slightly greater than the minimum inside diameter d1 of the tube 1, the end corrugation 3 is clamped lightly onto the zone 17, thus providing sealing while also obtaining good retention of said corrugation against the rear barb 14.3.

It is therefore not necessary to provide external means for stiffening the end of the tube 1.

Naturally, the invention is not limited to the embodiment described and variant embodiments can be applied thereto without going beyond the ambit of the invention as defined by the claims.

In particular, the diameter D3 can be smaller than the diameter d1.

In addition, the zone 17 could be of a length L2 enabling it to receive a single end corrugation or a plurality of end corrugations.

Furthermore, the coupling endpiece may be of a shape other than the shape described and may include some other number of barbs, for example. Thus, FIG. 2 shows a coupling endpiece in which there are two barbs 14 and the distance L1 between the barbs 14 is equal to a multiple of the pitch p of the corrugations. Specifically, the rear barb 14.3 is of length L3 equal to the pitch p, and is spaced apart from the front barb 14.1 by a junction zone formed by a cylindrical surface 18 of length L4 equal to the pitch p and of diameter D1 greater than the minimum inside diameter d1 of the tube 1. The distance L1 between the barbs 14.1 and 14.2 is thus equal to twice the pitch p in this example. This embodiment makes it possible to use an engagement force that is smaller than with the embodiment of FIG. 1. This embodiment is particularly adapted to tubes that are relatively rigid, having corrugations of a shape that is close to being square, whereas the embodiment of FIG. 1 is better adapted to tubes that are more flexible having corrugations that are more rounded.

What is claimed is:

1. A corrugated tube having a corrugated end provided with a coupling device, wherein the corrugated tube has corrugations following one another at a predetermined pitch and possessing a minimum inside diameter and a maximum inside diameter, the coupling device is constituted by an endpiece engaged by force in said corrugated end and constituted by a tubular body possessing a first zone provided on the outside with at least two annular barbs of the Christmas-tree type that are spaced apart by a distance corresponding to the pitch of the corrugations of the tube and having a maximum diameter greater than the maximum inside diameter of the tube, the first zone presenting between the barbs a minimum diameter greater than the minimum inside diameter of the tube, and wherein the body has a second zone extending immediately behind the barbs to receive at least one end corrugation of the tube and having an outside diameter less than a diameter of a junction zone between two annular barbs.

2. A corrugated tube according to claim 1, wherein the outside diameter of the second zone is close to the minimum inside diameter of the tube.

3. A corrugated tube according to claim 1, wherein the distance between the annular barbs is equal to the pitch of the corrugations.

4. A corrugated tube according to claim 1, wherein the distance between the annular barbs is equal to a multiple of the pitch of the corrugations.

5. A corrugated tube according to claim 1, wherein the maximum diameter of the annular barbs is determined so as to cause the end of the tube to expand by 30% to 40%.

* * * * *